United States Patent Office 2,773,686
Patented Dec. 11, 1956

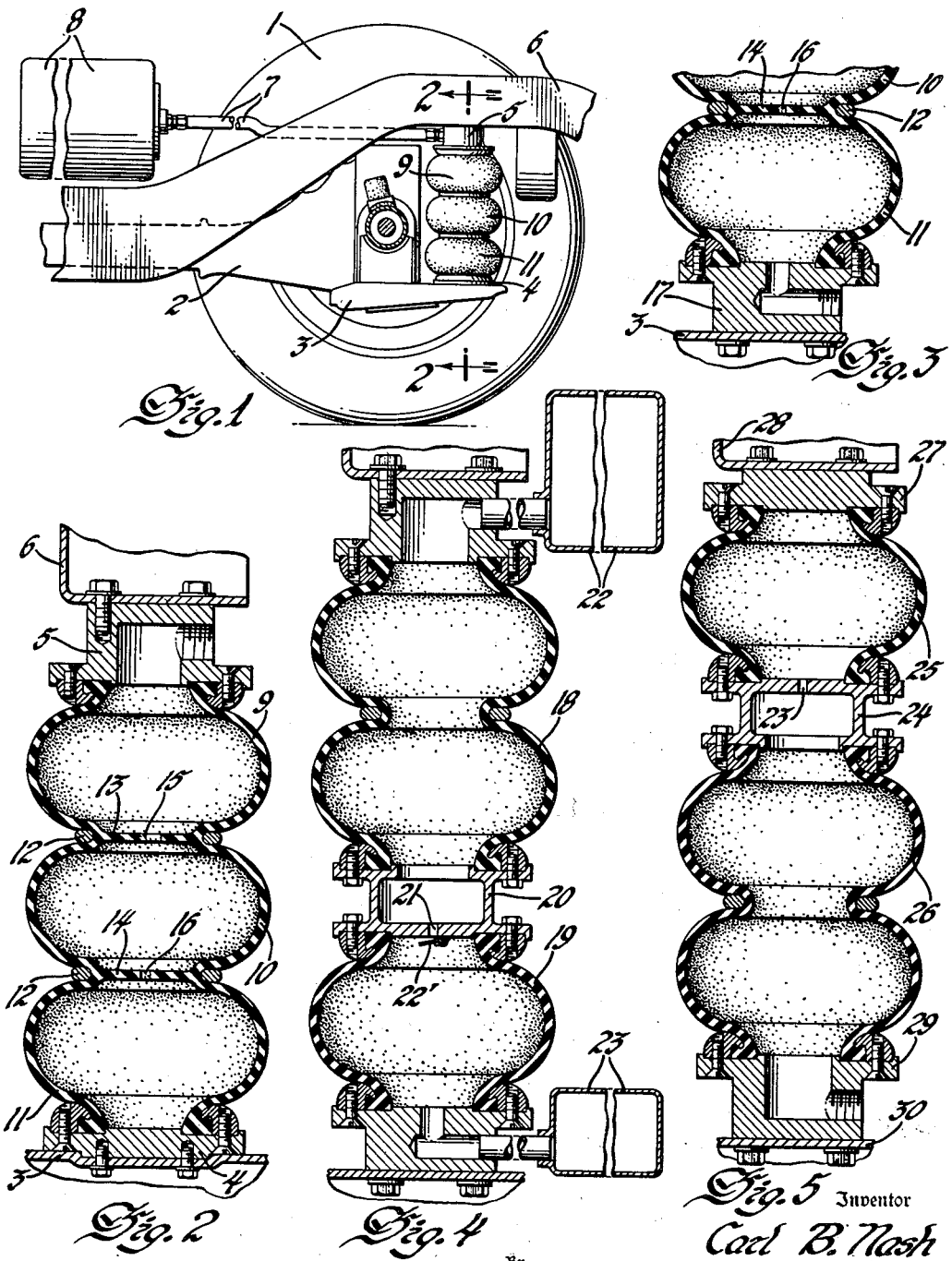

2,773,686

AIR SPRING

Carl B. Nash, Detroit, Mich., assignor to General Motors Corporation, Detroit, Mich., a corporation of Delaware Application September 17, 1947, Serial No. 774,646

10 Claims. (Cl. 267—65)

This invention relates to load supporting springs and more particularly to a pneumatic cushion and has been devised as a part of a program for improved riding comfort of passengers in buses and motor coaches which travel on highways.

It is an object of the invention to provide an improved air bag structure which retains the advantages and utilizes the acquired technique for manufacture of conventional devices but additionally incorporates certain benefits of a variable rate spring and responds flexibly to low amplitude vibrations while automatically becoming stiffer to high amplitude vibrations.

From the standpoint of operation and ruggedness a satisfactory air bag structure has been found to be a flexible wall container made of rubber with embedded reinforcing cords or fabric and shaped to bellows-like formation with metal rings in the narrow necks between adjoining folds to control lateral bag distention. When the bag is interposed between the vehicle road gear and the chassis, the air under pressure contained therein constitutes the load supporting medium and its compressibility affords an elastic cushion for the road shocks and relative movement between the road gear and the chassis. Supplementing the variable volume of the air bag, a rigid walled reservoir may be employed to prevent air pressure from increasing to a too high value upon bag deflection and the selection of reservoir capacity in relation to air bag capacity fixes or determines the spring rate.

For affording a variable rate action it is here proposed to partition the air bag into sections with metered communication therebetween, the arrangement in effect providing two or more air bags in series load supporting relation and the contained air in the sections, either alone or in conjunction with a supplementary reservoir, affords working volumes differing respectively. By reason of the small communicating passage, pressures in the neighboring sections will be equalized under static load but may differ upon sudden change in load. The pressures in the respective sections may tend to continue approximately equal under a gradual increase in load if the increase is slow enough that the bleeding of air from the smaller volume chamber keeps pace with its rate of compression, which comparatively is faster than that of the larger volume chamber, but upon a sudden application of force the restriction afforded by the metering hole causes the air trapped in the smaller container to offer greater resistance to deflection than that within the larger volume container. Thus in absorbing road vibrations of high frequency, as for example 600 per minute, the large chamber will function normally while the small chamber may be said to be substantially stiff if not inactive, since the change in direction of the high pressure air through the metered hole is so rapid that practically no air moves in or out and the small compartment has a high rate (weight/deflection) with a low deflection as compared with the large chamber. With low frequency large amplitude vibrations the large compartment may possibly collapse almost completely before the force is entirely absorbed but the high rate small chamber would be only partially collapsed and would continue to function to the limit of its capacity.

An advantage of the arrangement lies in the fact that for a given axle total movement with regard to the sprung mass from normal to where the axle strikes some part of the sprung mass, the rate of the large volume compartment may be decreased and thus increase the percentage of high frequency vibration absorbed. The change of rate for high amplitude low frequency vibration introduces a desirable damping action.

It will be understood that the reservoir referred to assists in affording the desired large volume for the low rate compartment with which it is in direct communication and that it is in indirect and restricted communication with the high rate compartment through the metered hole. A smaller reservoir may be employed in direct open communication with the high rate compartment to supplement its volume and in that case the size of the small reservoir will be a controlling factor in the amount of increase in rate of the high rate container over the low rate container under dynamic conditions. It may be pointed out that the difference in rates between the air bag sections would be greatest with a small metering hole or a small reservoir and would be zero if the hole or small reservoir were made sufficiently large.

For a detail description of a multiple stage air spring, reference will be had to the accompanying drawing wherein Figure 1 is a fragmentary elevational view, partly in section, showing the installation of an air spring; Figure 2 is a vertical section as on line 2—2 of Figure 1; Figure 3 is a sectional view showing a fragment of the air bag illustrated in Figure 2 and embodying a modification; and Figures 4 and 5 are sectional views of alternate air bag arrangements.

In the drawing the reference numeral 1 indicates a road wheel on the end of a driving axle assembly 2 which includes a bracket or spring perch 3 to which is bolted an end plate 4 at the bottom of the air spring. At the top of the air spring a hollow header 5 is bolted to the chassis frame 6 and has a threaded bore by which its interior may be joined by a conduit 7 to a metal tank or reservoir 8, conveniently carried by the chassis frame.

The air bag is in the nature of a rubber and fabric sleeve whose lower end may be secured to and closed by the end plate 4 and whose opposite end is secured to the hollow header 5 for communication with the reservoir 8. As shown in Figure 2 the air bag consists of three sections or bulbous portions 9, 10 and 11 arranged in series succession as individual air containing chambers. The neck portions between adjoining folds are embraced by metal bands or rings 12—12 which confine the bag walls and the neck portions are formed integrally with internal walls or partitions 13 and 14 separating the several chambers. Both partitions contain openings of predetermined sizes with the opening 15 in the wall 13 being relatively larger than the opening 16 in the partition 14. The openings assure communication between the several chambers and by their predetermined size, control the spring rate of the several chambers. It will be evident that the air within the chamber 9, being in free open communication with the reservoir 8, will afford greater flexibility than the smaller volume air within the sections 10 and 11 and also that the relative smallness of the opening 16 will restrict air flow therethrough to a greater extent than will the opening 15 so that the air confined within the chamber 11 will be more resistant to deflection than that within the chamber 10. It will also be apparent that the high frequency vibrations will deflect the walls of the chamber 9 to a greater extent than the walls of the chamber 10 and to an even greater extent than the walls of the chamber 11 because of the relative differences of air displacement and working volumes due to the restriction offered to the flow of air by the apertured partitions separating the chambers 10 and 11 from the large volume reservoir.

To modify the response of the chamber 11 its lower end, if desired, may be joined to a mounting plate, as shown at 17 in Figure 3, and which plate has drilled passageways for connection to a reservoir similar to the reservoir beforementioned but of much smaller capacity. The relative capacities of the two reservoirs and the air bag sections associated therewith, will control the variation in rates of the respective portions of the air spring.

If desired the air bag may be formed of a large and a small chamber with the larger chamber communicating with a large reservoir and the small chamber communicating with a small reservoir in the manner illustrated in Figure 4. In this case also the bags are separately formed, as indicated at 18 and 19, and are centrally joined by a metal coupling 20 which contains a dividing wall having a metered opening 21. Inasmuch as the larger bag 18 is in free open communication with the large reservoir 22 and the small bag 19 is in open communication with a relatively smaller reservoir 23 and because the differences in volumes available will control the variation in rate of deflection it is feasible to close the metering opening 21 completely. However, for the purpose of equalizing the pressure in the two bag sections when the parts are at rest, it is proposed to provide the metered opening 21 with a flap valve 22' which normally is biased to slightly open position and upon pressure increase in the chamber 19 is caused to seat and close the communicating passage.

In Figure 5 a metered opening 23 is provided in the coupling member 24 between separately formed air bags 25 and 26. A mounting plate 27 bolted to the vehicle chassis 28, closes the upper end of the small bag 25 while a mounting plate 29 bolted to the spring perch 30 has a hollow passage for joining the interior of the large capacity and low rate bag 26 with a supplementary air reservoir. In this construction the operation is as before described and a two stage spring is provided in which the variable response is controlled entirely by the size of the metering hole 23.

I claim:

1. In a variable rate air spring, a series of air bags arranged in series load supporting relation, a relatively small passage between an endmost bag and an intermediately positioned bag restrictive of the rate of air flow therebetween, a larger but restricted passage connecting an intermediately positioned air bag and the other endmost air bag and controlling the rate of air flow therethrough, and an air pressure reservoir in relatively free open communication with the last mentioned air bag.

2. In a variable rate air spring, a pair of variable air volume air containers arranged in series, one being substantially larger than the other and an air reservoir of fixed volume connected to both containers, the connection with the larger container being direct and substantially unrestricted for free air movement and the connection with the smaller container being indirect and by way of said larger container and an air bleed passage between the two containers which is more restricted to air flow than said first connection.

3. In a variable rate air spring, a relatively large air bag, a relatively small air bag in load supporting series relation to the large bag, means to equalize air pressure in said bags when they are under static load comprising a small bleed passage joining the bags, and valve means for closing said bleed passage in response to pressure increase in the small bag in excess of pressure increase in the large bag, caused by the smallness of said bleed passage and sudden load increase, said valve being normally biased to open position for free air flow through the bleed passage.

4. A variable rate spring including a large volume air bag, a small volume air bag arranged in series load supporting relation to the large volume bag, a restricted passage connecting said bags with each other, a large volume reservoir in open communication with the large volume air bag and a small volume reservoir in open communication with the small volume air bag.

5. A variable rate spring, comprising a relatively large volume container for air under pressure and including a reservoir and an air bag joined thereto, a relatively small volume container for air under pressure and also including a reservoir and an air bag joined thereto, means locating said air bags in series load supporting relation and a restricted air flow pressure equalizing path connecting said containers.

6. In a variable rate pneumatic spring, a stack of collapsible bags to contain fluid under pressure for resiliently supporting load, means to control the collapse of the several bags so that successive bags relative one to another have different rates of stiffness to sudden increase of load on the stack including a non-collapsible chamber in substantially unrestricted communication with one of the endmost bags so that the volume of the bag and the volume of the chamber are combined as one, a flow damper passage between said endmost bag and a middle bag, said damper being constricted to resist flow from the middle bag as compared with the flow capacity between the chamber and endmost bag and a bleed passage connecting the other endmost bag with a middle bag and offering flow check to a greater extent than that of the damper passage, said last mentioned endmost bag being otherwise sealed against escape of fluid therefrom.

7. In a variable rate air spring, a series of air bags arranged in series load supporting relation, a relatively small passage between an endmost bag and an intermediately positioned bag restrictive of the rate of air flow therebetween, an air pressure reservoir in relatively free open communication with said endmost bag, a larger but restricted passage communicating an intermediately positioned air bag and the other endmost air bag and controlling the rate of air flow therethrough, and an air pressure reservoir in relatively free open communication with the last-mentioned air bag.

8. In a variable rate air spring, a series of air bags arranged in series load supporting relation, a relatively small passage between an endmost bag and an intermediately positioned bag restrictive of the rate of air flow therebetween, an air pressure reservoir in relatively free open communication with said endmost bag, a larger but restricted passage communicating an intermediately positioned air bag and the other endmost air bag and controlling the rate of air flow therethrough, and an air pressure reservoir in relatively free open communication with the last-mentioned air bag, said last-mentioned reservoir having a smaller volume than said first reservoir.

9. A variable rate air spring having a plurality of volumes capable of selective response to vibrations of different frequencies and amplitudes including a plurality of variable volume containers in series communication and containing air under pressure, means for restricting air flow from one container to another, a fixed volume reservoir, and a free flow passage connecting said reservoir directly with one of said containers whereby the rate of air flow between containers is less than that at which air flows from said one of said containers into said reservoir.

10. A variable rate spring having a plurality of volumes capable of selective response to vibrations of different frequencies and amplitudes, comprising a plurality of chambers of different volumes in series communication and containing a compressible fluid under pressure, one of said chambers including a fluid reservoir of fixed volume, and each of said chambers being of variable volume, and means for restricting the flow of fluid from one chamber to the other to a rate less than that at which fluid flows into the reservoir, whereby the fluid in the chamber which includes the fixed volume is less resistant to vibrations than the fluid in said other chambers.

References Cited in the file of this patent

UNITED STATES PATENTS

| | | |
|---|---|---|
| 1,141,360 | Rudd | June 1, 1915 |
| 1,729,565 | Caretta | Sept. 24, 1929 |
| 1,878,756 | Caldwell | Sept. 20, 1932 |
| 1,915,303 | Forsyth | June 27, 1933 |
| 2,180,876 | Kuhn | Nov. 21, 1939 |
| 2,226,605 | Geyer et al. | Dec. 31, 1940 |